Nov. 4, 1952          C. L. MARTIN         2,616,657
LUBRICATED VALVE

Filed Sept. 7, 1945                          2 SHEETS—SHEET 1

INVENTOR.
Charles L. Martin

INVENTOR.
Charles L. Martin

Patented Nov. 4, 1952

2,616,657

UNITED STATES PATENT OFFICE 2,616,657

LUBRICATED VALVE

Charles L. Martin, Overland, Mo., assignor to American Car and Foundry Company, New York, N. Y., a corporation of New Jersey Application September 7, 1945, Serial No. 615,015

2 Claims. (Cl. 251—93)

This invention relates to lubricated valves and consists particularly in novel means for preventing leakage from the line while, at the same time, reducing the resistance to movement of the plug in previous valves of this type.

Where a lubricated valve is intended to control fairly high line pressure, it is necessary to use heavy grease in the sealing groove and place this grease under a relatively high pressure. Such heavy grease, however, when extended along the bearing surfaces between the valve body and plug, resists turning of the plug, particularly from the closed position in which the line pressure forces the plug strongly against one side of the body.

It is an object of the present invention to provide a lubricated valve in which adequate sealing means is provided for the line pressure in all positions of the valve, while rotation of the valve plug is facilitated.

A more detailed object is to provide means for utilizing a relatively light lubricant between the bearing surfaces of the plug and body and a much heavier lubricant in the orifices and grooves which seal the line.

These objects and other more detailed objects hereafter appearing are attained substantially by the structure illustrated in the accompanying drawings in which.

Figure 1:
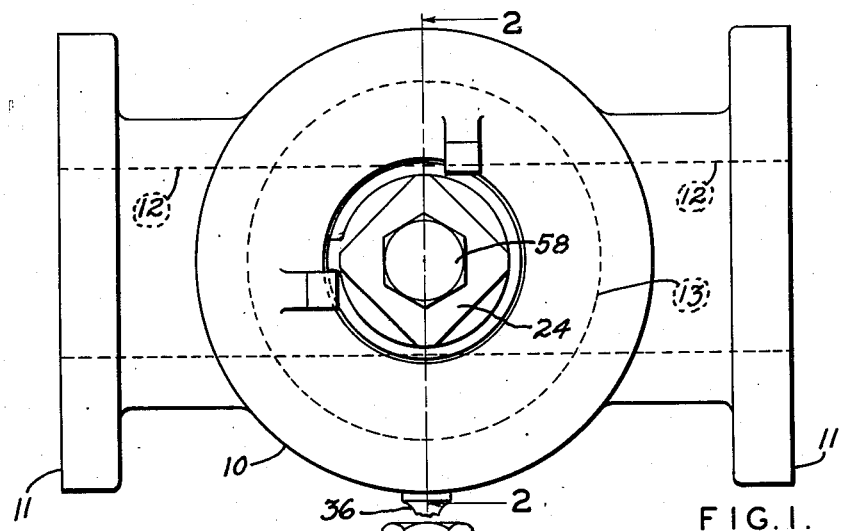
Fig. 1 is a top view of a valve embodying the invention.

The figures show a two-way valve having a cylindrical body 10 with flanged extensions 11 for attachment into a fluid line. Aligned passages 12 form the valve ports opening into the interior of the body. The internal side or longitudinal wall 13 of the body is regularly cylindrical and the upper end wall 14 has a central opening 15. The bottom end of the casing has a threaded opening 16 to which is secured a threaded closure plug 17 having a wrench receiving central projection 18. The internal surface of the plug has a central circular recess 19 and a hole 20 extends through the center of the plug.

The valve plug has a generally cylindrical body portion 22 with a transverse orifice 23 and an upwardly projecting actuating stem 24 of non-circular section for receiving a wrench or suitable handle. The stem has a cylindrical base portion 25 received in orifice 15 in the casing top wall. A packing 26 is located in a rebate 27 and is compressed between the stem and casing to prevent leakage around the stem. The bottom end of the plug has cylindrical projection 28 received in circular recess 19 in the threaded closure plug. A packing 29 in a rebate 30 is compressed between the closure and valve to prevent escape of fluid and grease at this point. The horizontal areas of plug extensions 25 and 28 exposed to atmosphere are identical so that the end thrust due to atmosphere is balanced.

The valve plug is originally machined to form a close running fit within the interior of the valve body. Thereafter, the entire intermediate portion of the plug body immediately adjacent and surrounding orifice 23 therein is slightly reduced so that more clearance is provided between this part of the plug and the body wall than between the upper and lower extremities of the plug and the body. The top wall 31 and bottom wall 32 of the plug bear against, respectively, the undersurface of the body top wall and the upper surface of closure 17 to secure the plug against endwise movement. The top and bottom edges of the plug are chamfered as at 33 and 34.

Figure 2:
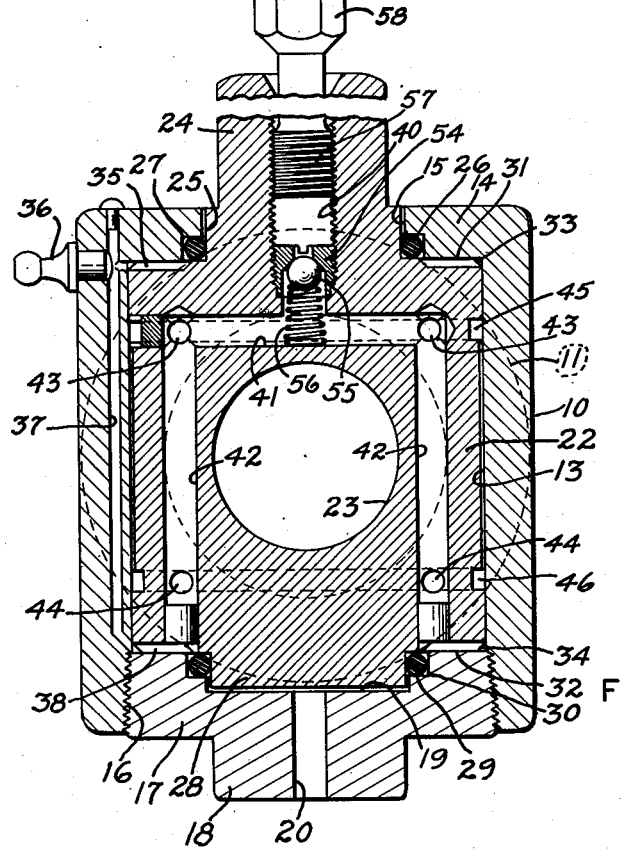
Fig. 2 is a section taken on line 2—2 of Fig. 1.
Figure 5:
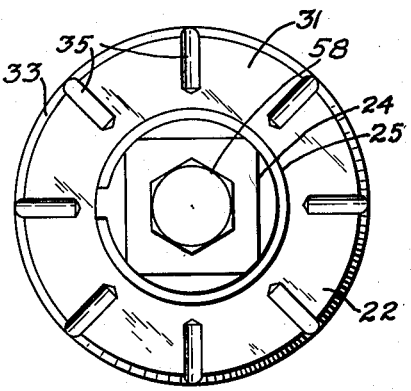
Fig. 5 is a top view of the plug disassembled from the body.

A series of short radial grooves 35 are formed in the top of the plug, but terminate short of the plug stem, although the inner extremities of these grooves extend to rebate 27, as shown in Figs. 2 and 5. A grease fitting 36 is mounted in the upper portion of body 10 and communicates with the space formed by top chamfer 33 in the plug and with a vertical passage 37 in the body which, at its lower extremity, communicates with the space formed by lower chamfer 34 on the plug. Short radial grooves 38 are provided in the undersurface of the plug.

Figure 3:
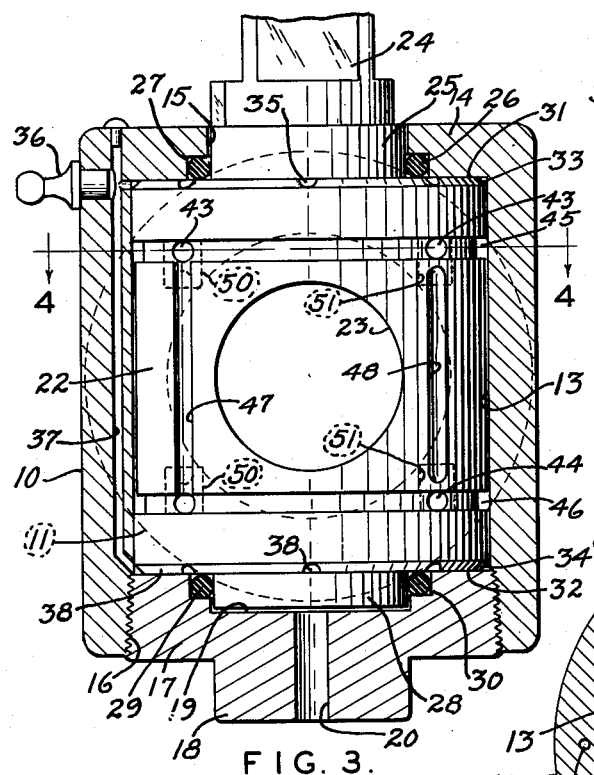
Fig. 3 is a view similar to Fig. 2, but showing the plug in elevation.
Figure 4:
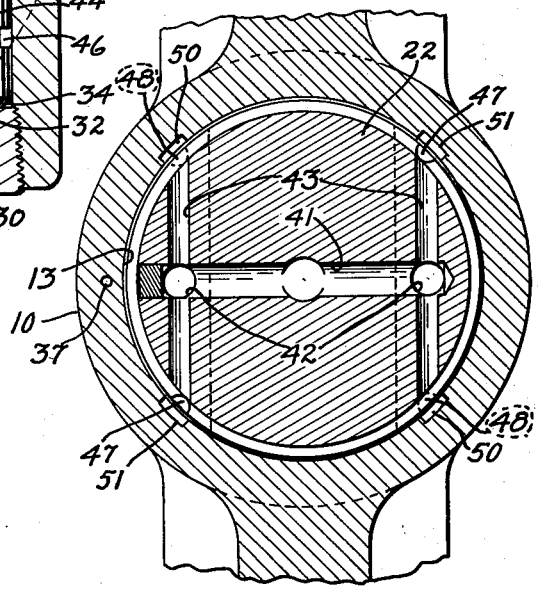
Fig. 4 is a horizontal section taken on line 4—4 of Fig. 3.
Figure 6:
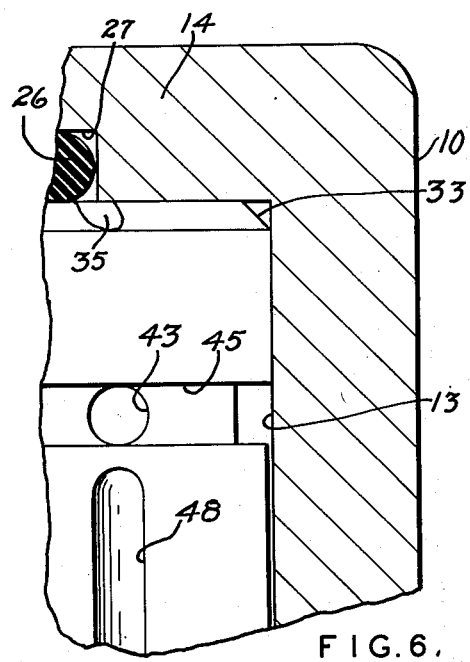
Fig. 6 is an enlarged vertical section showing a corner portion only of the structure in Fig. 3.

A threaded orifice 40 extends centrally through plug stem 24 and at its lower extremity communicates with a cross passage 41 in the plug which, at its extremities communicates with vertical passages 42 and with smaller, horizontal ducts 43. Additional horizontal ducts 44 intersect the lower portions of vertical passages 42. A pair of horizontal grooves 45 and 46 extend around the circumference of the plug at the levels, respectively, of ducts 43 and 44. As best shown in Figs. 3 and 4, a pair of diagonally spaced, vertical grooves 47 in the surface of the plug connect grooves 45 and 46. Shorter, vertical grooves 48 are formed in the wall of the plug opposite grooves 47, these terminating short of horizontal grooves 45 and 46. Eight short grooves or recesses 50 and 51 are milled in the inner wall of the casing body, opposite the extremities of vertical grooves 47 and 48. In the fully open position of the plug, recesses 50 connect the short grooves to grease pocket 40 in the stem. In the closed position, diagonally opposite recesses 51 connect these grooves to passages 43 and 41 and the grease pocket.

In partially open plug position, when short grooves 48 are exposed to the line, they are cut off from the source of grease under pressure.

A valve seat element 54 is located in orifice 40 in the plug stem and receives a ball check valve 55 normally seated by a spring 56. A screw 57 threaded into the upper part of orifice 40 has a hexagonal head 58 for receiving a wrench. Orifice 40 is intended to receive a stick of heavy lubricating grease which is forced into feed holes 41, 42, 43, and 44 and the system of framing grooves 45, 46, 47, and 48 by means of screw 57.

In operation, a relatively light grease is forced through fitting 36 into upper chamfer 33 and upper radial grooves 35 on the plug and through into vertical passage 37 and lower chamfer 34 and lower radials 38. This oil spreads on the top and bottom bearing surfaces of the plug and the small portions of the vertical plug wall above groove 45 and below groove 46, these being the only portions of the wall which bear against the inner wall of the valve body. Thus, the extent of the bearing surface between the plug and body is greatly reduced and this portion is lubricated by a relatively light free flowing grease.

The heavy grease forced from orifice 40 into cross passage 41 and ultimately into framing grooves 45, 46, 47, and 48 which completely surround valve ports 12 in the wide open and fully closed positions of the valve and effectively seal these ports to prevent escape of line fluid. However, because of the relieved intermediate portion of the plug body, the tendency of this heavy grease under high pressure to resist rotation of the plug is greatly reduced. Moreover, the slight clearance of perhaps a few thousandths of an inch between the valve body and the intermediate part of the plug provides for escape of the heavy grease into the fluid line before this grease pressure can cause damage to the valve wall.

Thus, the valve is tight, even in high fluid line pressures and is relatively easy to operate. The arrangement of the sealing grooves in particular, is not essential but may be modified as desired. Obviously, the amount of clearance between the relieved central part of the plug and the valve body will be adjusted according to the weight of grease used and the desired pressure thereof. The opposing pressures of the light and heavy greases will prevent these from escaping substantially beyond their points of contact adjacent horizontal grooves 45 and 46.

The exclusive use of all modifications as come within the scope of the appended claims is contemplated.

I claim:

1. In a plug type of valve, a ported body member having a cylindrical bore, a rotatable plug in said bore provided with parts at its upper and lower extremities having a bearing fit with said bore, a transverse passage through the plug adapted for connection with said body ports, grooves in the outer surface of said plug spaced from but surrounding each opening for said passage, the portions of the plug outer surface circumferentially of said plug between its upper and lower extremities being of reduced diameter extending between the bearing parts throughout the entire outer plug wall, independent lubricating systems for said plug including a separate means for supplying heavy sealing lubricant to said grooves under pressure to force the lubricant into sealing relation about the openings and throughout said reduced diameter portion of said plug, and a separate means to supply light lubricant to said parts on said plug having a bearing fit with the bore, the clearance of said plug parts in the bore being such as to substantially maintain the lubricants separate.

2. In a plug type of valve, a ported body member having a cylindrical bore, a rotatable plug in said bore provided with parts at its upper and lower extremities having a bearing fit with said bore, a transverse passage through the plug adapted for connection with said body ports, vertically and circumferentially extending grooves in the outer surface of said plug, spaced from but surrounding each opening for said passage, the portions of the plug outer surface circumferentially of said plug between its upper and lower extremities being of reduced diameter extending between the bearing parts throughout the entire outer plug wall, independent lubricating systems for said valve including a separate means for supplying heavy sealing lubricant to said grooves under pressure to force the lubricant into sealing relation about the openings and throughout said reduced diameter portion of said plug, said separate means for supplying heavy sealing lubricant under pressure to all of said grooves being operative in the full open or closed position of said plug and having means to interrupt the supply to some of said vertical grooves in intermediate valve opening or closing positions of said plug, and a separate means to supply light lubricant to said parts on said plug having a bearing fit with the bore.

CHARLES L. MARTIN.

REFERENCES CITED

The following references are of record in the file of this patent:

UNITED STATES PATENTS

| Number | Name | Date |
|---|---|---|
| 1,872,626 | Ernst et al. | Aug. 16, 1932 |
| 2,086,946 | Rick | July 13, 1937 |
| 2,099,169 | MacClatchie | Nov. 16, 1937 |
| 2,319,943 | Nordstrom | May 25, 1943 |
| 2,388,827 | Carter | Nov. 13, 1945 |

FOREIGN PATENTS

| Number | Country | Date |
|---|---|---|
| 838,548 | France | Dec. 7, 1938 |